United States Patent
Brill (12)

(10) Patent No.: US 9,371,736 B2
(45) Date of Patent: Jun. 21, 2016

(54) METHOD AND DEVICE FOR MODIFYING A SECONDARY AIR SYSTEM IN A GAS TURBINE ENGINE

(75) Inventor: Jeffrey Carl Brill, Poway, CA (US)

(73) Assignee: Solar Turbines Incorporated, San Diego, CA (US)

( * ) Notice: Subject to any disclaimer, the term of this patent is extended or adjusted under 35 U.S.C. 154(b) by 895 days.

(21) Appl. No.: 13/478,948

(22) Filed: May 23, 2012

(65) Prior Publication Data

US 2013/0312260 A1 Nov. 28, 2013

(51) Int. Cl.
| | | |
|---|---|---|
| *B23P 19/00* | (2006.01) | |
| *F01D 9/06* | (2006.01) | |
| *F02C 7/36* | (2006.01) | |
| *B23P 6/00* | (2006.01) | |
| *B23P 19/04* | (2006.01) | |
| *B23P 19/12* | (2006.01) | |

(52) U.S. Cl.
CPC . *F01D 9/065* (2013.01); *F02C 7/36* (2013.01); *B23P 6/00* (2013.01); *B23P 19/042* (2013.01); *B23P 19/12* (2013.01); *B23P 2700/13* (2013.01); *Y10T 29/49229* (2015.01); *Y10T 29/53* (2015.01)

(58) Field of Classification Search
CPC ........... F02C 7/36; Y10T 29/53; B23P 6/002; B23P 19/042; B23P 19/12; B23P 2700/13; F01D 5/005; F05B 2230/70; F05B 2230/80
USPC .......... 29/889.1, 889.2, 407.09, 407.1, 426.4, 29/426.5, 426.6, 447, 888, 700; 403/378, 403/379.5, 109.6
See application file for complete search history.

(56) References Cited

U.S. PATENT DOCUMENTS

| | | | |
|---|---|---|---|
| 963,087 A | * | 7/1910 | Sproul .............................. 294/97 |
| 5,037,603 A | | 8/1991 | Wood et al. |
| 2002/0182059 A1 | | 12/2002 | Escure et al. |
| 2003/0127852 A1 | * | 7/2003 | Usui .......................... 285/125.1 |
| 2009/0282834 A1 | | 11/2009 | Hein |
| 2010/0281844 A1 | * | 11/2010 | Sholes et al. ............... 60/39.182 |
| 2011/0079018 A1 | | 4/2011 | Pucovsky et al. |
| 2011/0110783 A1 | * | 5/2011 | Addis et al. ............... 416/219 R |
| 2012/0017604 A1 | * | 1/2012 | Rauch et al. .................... 60/796 |
| 2012/0167388 A1 | * | 7/2012 | Black et al. ..................... 29/888 |

FOREIGN PATENT DOCUMENTS

| | | | |
|---|---|---|---|
| KR | 2001-0056341 | * | 7/2001 |
| KR | 100332652 | | 4/2002 |

OTHER PUBLICATIONS

Prior Art Strut Bleed Tube Assembly (Prior to May 2011) in 1 page.

* cited by examiner

*Primary Examiner* — David Bryant
*Assistant Examiner* — Steven A Maynard
(74) *Attorney, Agent, or Firm* — Procopio, Cory, Hargreaves & Savitch LLP

(57) ABSTRACT

A method and device for modifying a gas turbine engine is disclosed herein. The method for modifying a gas turbine engine includes accessing a first outward end of a first tube installed in the gas turbine engine, the first tube having a tube axis. Then attaching an extraction tool to the first outward end of the first tube, and applying an axial force to the first tube using the extraction tool, the axial force relative to the tube axis, thus breaking a first interference seal between a first interface surface on a first inward end of the first tube and a receiving member of the gas turbine engine. The method continues with removing the first tube from the gas turbine engine.

16 Claims, 6 Drawing Sheets

METHOD AND DEVICE FOR MODIFYING A SECONDARY AIR SYSTEM IN A GAS TURBINE ENGINE

TECHNICAL FIELD

The present disclosure generally pertains to gas turbine engines, and is more particularly directed toward a modification of a gas turbine secondary air ducting system.

BACKGROUND

Currently, gas turbine engines include secondary air or "bleed air" systems where compressed air is provided for purposes other than the combustion reaction. In particular, compressed air is ducted from the compressor to other locations on the gas turbine engine using conventional pipe fitting.

Over the life of a gas turbine engine, one or more portions of a bleed air system may need to be removed, replaced, and/or overhauled. For example, bleed tubing may have to be removed during overhaul or in-service replacement.

The present disclosure is directed toward overcoming one or more of the problems discussed above as well as additional problems discovered by the inventor.

SUMMARY OF THE DISCLOSURE

The present disclosure relates to a self-sealing and self-centering tube installed in a gas turbine engine and a method and system to remove them. These self-sealing and self-centering tubes may eliminate or reduce the need for welded tubes and/or multiple independent seals, such as c-seals. The tubes are installed cold and then self seal and center. The present disclosure provides a self-sealing and self-centering tube with a hole for a tool to engage to remove the tube. The tool includes a sliding weight to pull the tube out.

A method for modifying a gas turbine engine is disclosed herein. The method for modifying a gas turbine engine includes accessing a first outward end of a first tube installed in the gas turbine engine, the first tube having a tube axis. Then attaching an extraction tool to the first outward end of the first tube, and applying an axial force to the first tube using the extraction tool, the axial force being relative to the tube axis, thus breaking a first interference seal between a first interface surface on a first inward end of the first tube and a receiving member of the gas turbine engine. The method continues with removing the first tube from the gas turbine engine. According to one embodiment, a device for modifying a secondary air system in a gas turbine engine is also disclosed herein. According to another embodiment, a method for modifying a secondary air system in a gas turbine engine is also disclosed herein.

DETAILED DESCRIPTION

Figure 1:
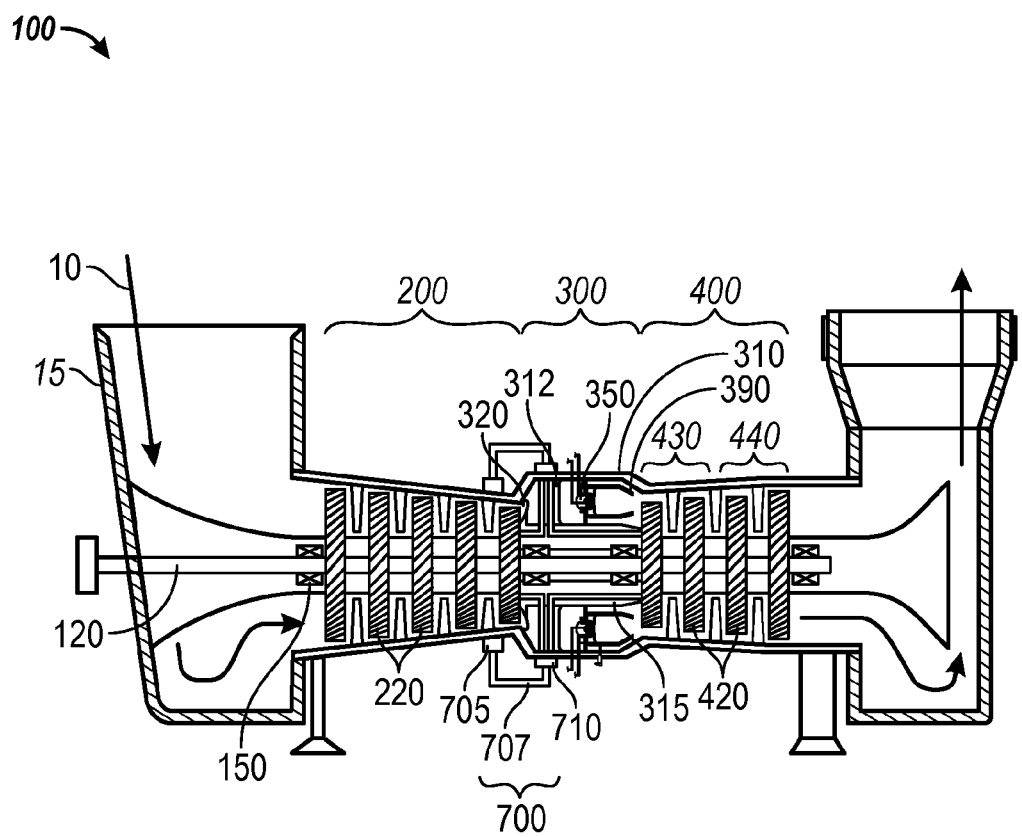
FIG. 1 is a schematic illustration of an exemplary gas turbine engine.

FIG. 1 is a schematic illustration of an exemplary gas turbine engine. Some of the surfaces have been left out or exaggerated (here and in other figures) for clarity and ease of explanation. A gas turbine engine 100 typically includes a gas producer or "compressor" 200, a combustor 300, and a turbine 400. The compressor 200 and turbine 400 include one or more compressor rotor assemblies 220 turbine rotor assemblies 420, respectively. The one or more compressor rotor assemblies 220 and one or more turbine rotor assemblies 420 may be mechanically coupled to a shaft 120 or drum (not shown), which is supported by one or more bearing assemblies 150. Generally, the gas turbine engine will have an axis of rotation defined by the longitudinal axis of its shaft 120 (or drum).

The combustor 300 may include a combustor case 310, an internal combustor strut ("strut") 312, a bearing housing 315, a diffuser 320 a gas turbine injector 350, and a combustion chamber 390. Depending on its configuration, the combustor 300 may include one or more of these components. For example, combustor 300 may be configured to include a several, evenly spaced struts 312, the struts 312 radially extending between the bearing housing 315 and the combustor case 310. Likewise, combustor 300 may be configured as a can, annular, or cannular type, depending on the configuration of its combustion chamber(s) 390, which may include one or more combustion chamber(s) 390. Here, combustor 300 is illustrated in an annular type configuration. Also, one or more components/features may be combined or distributed. For example, combustor case 310, strut 312, and diffuser 320 made be made into a single multi-feature unit.

Functionally, a gas (typically air 10) enters an inlet 15 as a "working fluid", and is compressed by the compressor 200. When compressed, air 10 may be used as needed: for combustion, for cooling, for pressurization, etc. Accordingly, air 10 may be divided into primary air and secondary air. Primary air is provided to combustor 300 for the combustion reaction, and, secondary air is provided throughout gas turbine engine 100 via secondary air system 700 (or "bleed system") for secondary uses such as cooling and pressurized buffering.

Once secondary air leaves the compressor 200, it may be handled by the secondary air system 700. In particular, secondary air system 700 may tap one of the higher stages of compressor 200 and route it via any combination of dedicated ducting, internal passageways, interstices between components, and any other air channels. Secondary air system 700 may include a network of air flow paths configured to distribute, deliver, and recover secondary air as needed throughout the gas turbine engine 100.

To illustrate, secondary air system 700 may include a compressor port 705 that is pneumatically coupled to secondary air external plumbing 707. The secondary air external plumbing 707 can then distribute secondary air as needed. For example, secondary air external plumbing 707 may pneumatically couple with a strut bleed tube external flange assembly 710 and provide compressed secondary air to a strut 312 of combustor 300. Additionally, secondary air system 700 may recover "mixed air" (i.e., air that has been "used" or otherwise exposed to lubricants and/or other "contaminants") from air passageways throughout the gas turbine engine 100 for reuse or post-processing.

Figure 2:
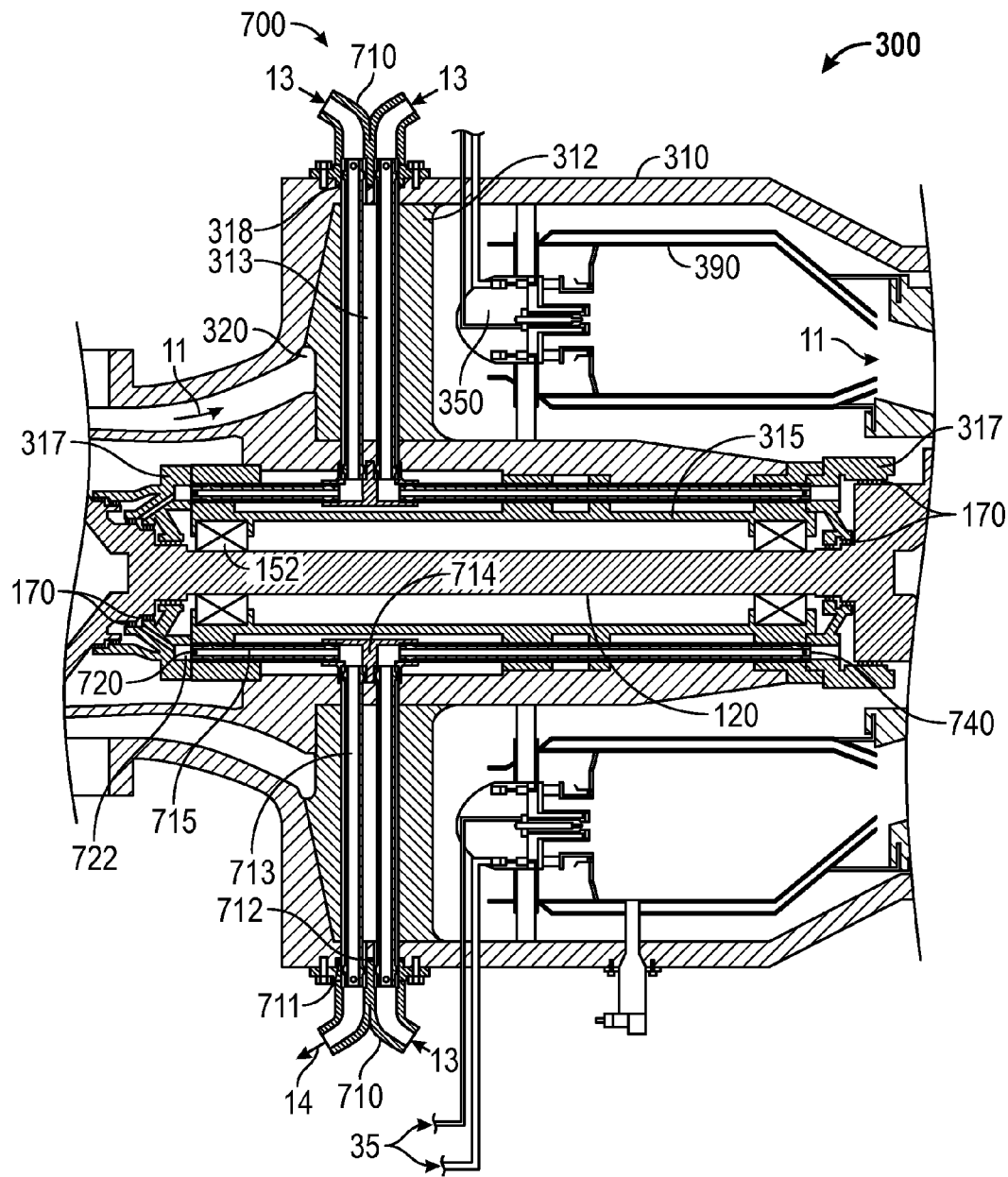
FIG. 2 is a cross sectional view of a portion of a gas turbine engine including the combustor, illustrating internal tubing, airflow, and fixtures of a secondary air system.

FIG. 2 is a cross sectional view of a portion of a gas turbine engine including a combustor, illustrating internal tubing, airflow, and fixtures of a secondary air system. As discussed above, combustor 300 may include a plurality of struts 312, providing radial support between the bearing housing 315 and the combustor case 310. As illustrated, struts 312 may be placed in the air stream of diffuser 320, radially distributed, and positioned between adjacent gas turbine injectors 350. Note, for clarity, repeated or similar components may only be called out at in a single location in the figure.

In addition to providing radial support, struts 312 may be configured to provide internal passageways traversing the pressurized flow regions inside combustor 300, shielded from interaction with primary air 11. In particular, one or more cylindrical passageways may be provided within the walls of strut 312 for carrying secondary air 13, mixed air 14, lubricants, or other media between the outside of the combustor case 310 and the internal regions of the gas turbine engine 100 (e.g., inside or nearby the bearing housing 315).

According to one embodiment, strut 312 may include one or more passageways configured to allow tubes or other forms of ducting to pass through. The passageways may be generic thru-openings encompassing the entire inner region of strut 312, passages that correspond to the tubes/ducting passing through, or a combination thereof. For example, as illustrated, strut 312 may include a strut passageway 313 having a generally straight, cylindrical shape and a sufficient cross section to provide passage of one or more tubes or ducts. Moreover, each individual strut 312 may have multiple and/or distinct passageways from other struts 312, depending on its particular usage (e.g., secondary air 13, mixed air 14, lubricants, etc.).

With these passageways through strut 312, secondary air system 700 may access internal regions of the combustor 300. To do so, secondary air system 700 may use a combination of a strut bleed tube external flange assembly 710, and a combination of, for example, a strut bleed tube 713, a bleed elbow 714, and an axial bleed tubes 715, or the like. It is understood that other combinations of tubing are contemplated.

Generally, once inside combustor 300, secondary air system 700 may pneumatically couple and further integrate with other secondary air supply and distribution features within the internal regions of the gas turbine engine 100. In particular, secondary air system 700 may pneumatically couple with supply and distribution features at a combustor/compressor secondary air interface 720, or at a combustor/turbine secondary air interface 740.

To illustrate, axial bleed tubes 715 may pneumatically couple with a bleed air gallery 722 that is made annularly into an end cap assembly 317. The end cap assembly 317 may be located, for example, on the forward or aft end of bearing housing 315. In this example, the end cap assembly 317 may be thus be configured to distribute secondary air 13 to a plurality of buffered labyrinth seals 170 for sealing off bearing assembly 152. Here, the bearing assembly 152 happens to be supporting the aft end of compressor 200, and is located within the bearing housing 315.

As illustrated, secondary air system 700 may interface with and enter combustor 300 through one or more of struts 312. To facilitate this interface, combustor 300 may include the abovementioned strut bleed tube external flange assembly 710. Strut bleed tube external flange assembly 710 may include a manifold configured to pneumatically couple with secondary air external plumbing 707 (see FIG. 1) and transmit secondary air 13 and/or mixed air 14 to/from the combustor 300. For example, the upper strut bleed tube external flange assembly 710 may provide for secondary air 13 to enter and supply the both the compressor side and the turbine side of combustor 300. Meanwhile, the lower strut bleed tube external flange assembly 710 may provide for mixed air 14 to leave (e.g., egress) the compressor side of combustor 300, and for secondary air 13 to enter and supply (e.g., cooling) the turbine side of combustor 300.

Additionally, strut bleed tube external flange assembly 710 may be sealed to the combustor case 310 when fastened. In particular, strut bleed tube external flange assembly 710 may be sealed directly to the strut 312 using, for example, a c-seal 711 and any associated hardware (e.g., face plate 712). C-seal 711 may be a single use, spring-energized c-ring flange seal.

In one embodiment, strut bleed tube external flange assembly 710 may rest in a mating recess 318 (e.g., both circular) built into combustor case 310. At this location, c-seal 711 may be placed at the periphery of the interface between mating recess 318 and strut bleed tube external flange assembly 710. In particular, face plate 712 may be configured (relative to the longitudinal axis of strut 312) to provide radial support to c-seal 711 by meeting the inner diameter of c-seal 711, as well as an axial compression limit to c-seal 711. Also, face plate 712 may include any thru-passages corresponding to those in strut bleed tube external flange assembly 710, permitting passage of any strut bleed tubes 713. Alternately, a face plate 712 may be located between the strut 312 and strut bleed tube external flange assembly 710 in a similar manner.

Strut bleed tube external flange assembly 710 may be removably fastened (e.g., bolted) onto the combustor case 310. In this way, strut bleed tube external flange assembly 710 may be readily removed (e.g., un-bolted), providing access to the strut 312 underneath. Accordingly, in the exemplary illustrated embodiment, removal of strut bleed tube external flange assembly 710 will provide external access to the strut passageway 313 and to one or more strut bleed tubes 713 therein.

Figure 3:
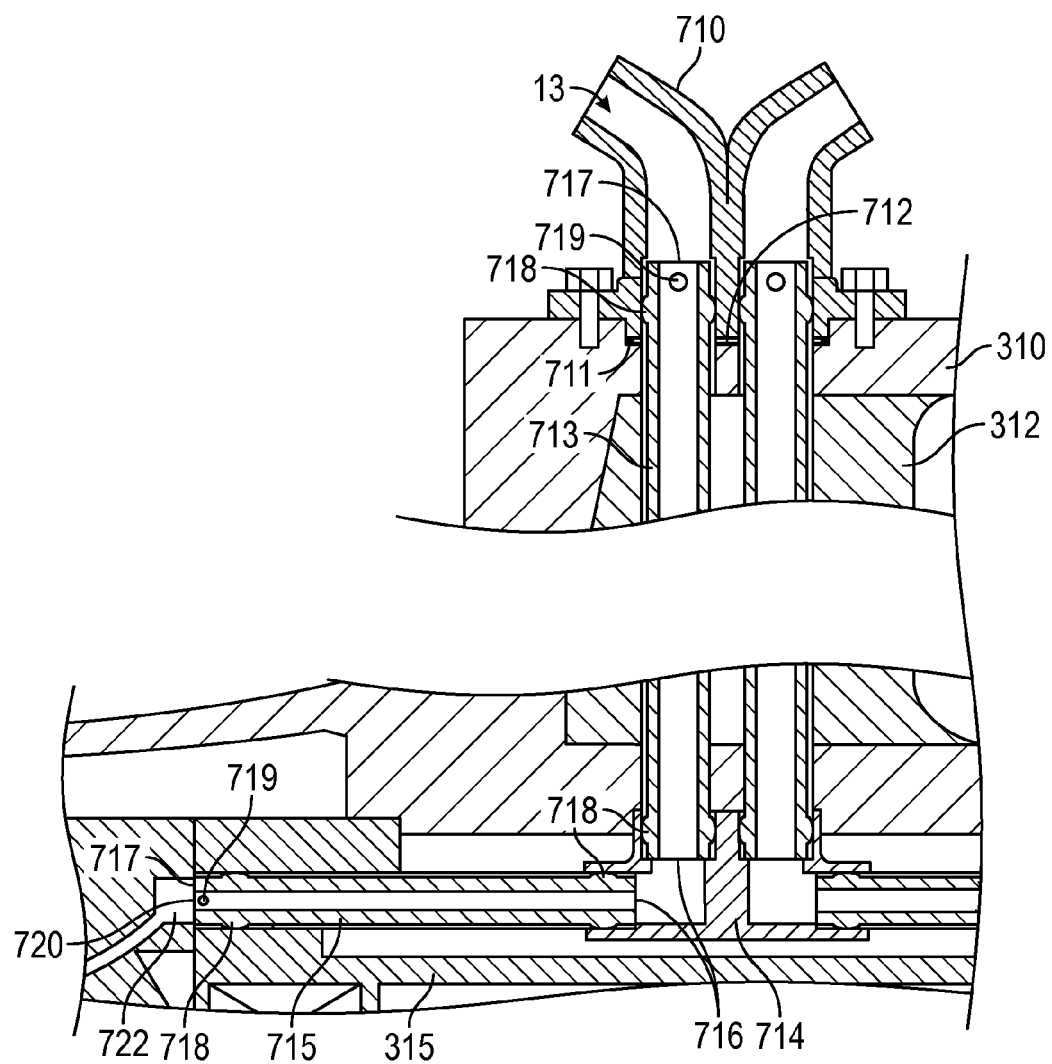
FIG. 3 is a cross sectional view of portions of a secondary air system tubing assembly, internal to a combustor, the portions showing the tube ends.

FIG. 3 is a cross sectional view of portions of a secondary air system tubing assembly, internal to a combustor, the portions showing the tube ends. Here, each secondary air system tubing assembly is illustrated as generally including at least one strut bleed tube 713, at least one bleed elbow 714, and at least one axial bleed tube 715, as described above.

However, as above, it is understood each secondary air system tubing assembly may be physically unique, and also, while each tubing assembly may be used for a unique application (e.g., secondary air/mixed air, flow in/out, compressor supply/turbine supply, etc), for clarity of the present disclosure, only a single air application will be discussed here. In particular, discussion will focus on the tubing application for secondary air 13 to flow into and supply the compressor 200 (not shown) at a combustor/compressor secondary air interface 720. For example, here, secondary air 13 supplies buffer air into an annular gallery such as the bleed air gallery 722 described above.

Additionally, while strut 312 is shown as including two strut bleed tubes 713, it is understood that fewer or more tubes may be used. Likewise, while strut bleed tubes 713 are illustrated (relative to the axis of rotation of the gas turbine engine 100) as radially extending through the strut 312 and being axially adjacent (i.e., sided-by-side in the fore-aft direction), it is further understood that strut bleed tubes 713 may equally be aligned circumferentially, concentrically, off set, or not aligned at all.

Turning from the tubes' position and orientation (relative to the gas turbine engine 100), each of the strut bleed tube 713 and the axial bleed tube 715 may include one or more sealing, centering, and extraction features. It is understood that each tube generally includes a tube axis longitudinally running down the center of the tube and has a cross sectional outer profile relative to the tube axis. For clarity and convenience, these sealing, centering, and extraction features are described hereinafter relative to their respective tube axes.

According to one exemplary embodiment, strut bleed tubes 713 and axial bleed tubes 715 may be straight, pressure bearing tubes with an integrated spherical seal 718 at or near each end. The tubes and spherical seals 718 may share a concentric axis (i.e., the tube axis) and have a circular cross sectional outer profile (i.e., cut perpendicular to the tube axis), which may be described by an outer diameter ("OD"). Similarly, the respective receiving member (e.g., strut tube external flange assembly 710 and elbow 714) may have a similar, associated cross sectional inner profile, which likewise may be described by its inner diameter ("ID"). Each spherical seal 718 may maintain a constant OD, relative to the ID of its respective receiving member, through a variety of entry angles, and thus be self-centering.

Figure 4:
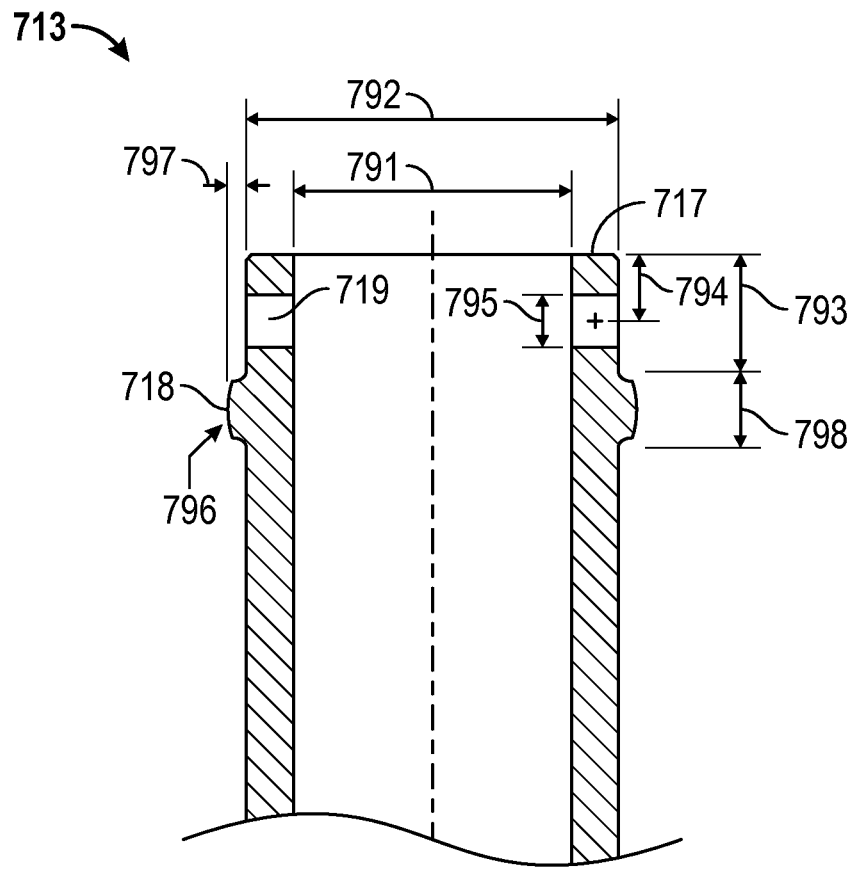
FIG. 4 is a cross sectional view of the end portions of a self-sealing and self-centering tube.

FIG. 4 is a cross sectional view of the end portions of a self-sealing and self-centering tube. Here, strut bleed tube 713 is illustrated as exemplifying some of the sealing, centering, and extraction features of both the strut bleed tubes 713 and the axial bleed tubes 715. In particular, strut bleed tube 713 includes spherical seals 718, 799, an outward end extension section 793, and an extraction interface 719. It should be noted that, in contrast to FIG. 3, strut bleed tube 713 is illustrated rotated 90 degrees around tube axis 790, showing extraction interface 719 as including two diametrically opposed holes through the tube wall.

The tubes and spherical seals 718 may be made of a stainless steel such as 300 series corrosion-resistant steel (300 CRES). In this view, strut bleed tube 713 includes both a spherical seal 718 that is integrated into the strut bleed tube 713 and a spherical seal 799 that is added to the strut bleed tube 713. In particular, spherical seal 718 is cut from a tube stock whereas spherical seal 799 is mechanically coupled to the cut tube. For example, in the case of spherical seal 718, the tube stock may include a constant tube ID 791 corresponding the design flow path and rate, but have a wall thickness of at least that of seal height 797. The tube stock may then be lathed down to its designed tube OD 792, leaving spherical seal 718. In contrast, spherical seal 799 may be added to the cut tube (already having desired tube ID 791 and tube OD 792). Furthermore, according to one embodiment, once the spherical seal 799 is positioned on the tube, it may be fixed in place through an operation such as welding, brazing, press-fit, etc. It is understood that both the inward end 716 (i.e., the end of strut bleed tube 713, relative to the tube axis 790 that first enters the strut) and the outward end 717 (i.e., the end distal to inward end 716 relative to the tube axis 790) of strut bleed tube 713 may have a single type of spherical seal 718, 799 (i.e., both "integrated" or both "added"), or have their positions reversed from those illustrated.

When installed, each spherical seal 718, 799 forms an interference seal with its respective receiving member. As such, each may differ in diameter (seal OD and receiver ID). In particular, spherical seals 718, 799 may have an OD slightly larger (at its interfacing surface) than that of its receiving member. In this way, the spherical seals 718, 799 may provide an interference fit, mechanically coupling and pneumatically sealing the tubes to the respective receiving member once installed.

The OD of spherical seals 718, 799 (i.e., the combination of tube OD 792 and seal height 797 off opposing sides) may vary depending on the particular performance requirements of the application. In particular, the OD of spherical seals 718, 799 should be sufficiently large to maintain the required interference seal once the tube has been installed into its respective receiving member. Moreover, the interference seal should contemplate the operating flow, pressure, temperature, and leakage requirements of the particular application. For example, in the case of a secondary air system porting compressed air off the compressor 200 (not shown), the OD of the interfacing surface of spherical seal 718, 799 or "interface surface" may exceed the ID of the bleed elbow 714 (not shown) on the order of 0.13% on a 1.20 inch nominal ID receiver (measured under ambient conditions and when uninstalled).

In order to install strut bleed tubes 713 and axial bleed tubes 715 with an interference fit, the tubes may be chilled with liquid nitrogen or dry ice, for example, for several minutes prior to assembly. Then once they are pre-cooled, they may be inserted and articulated into position while still in their contracted state. Notably, the contracted state may only involve a reduction of few thousandths of an inch. Once the tube is installed, as the tube returns to ambient conditions, it will expand in place, creating the interference seal. Where the inward end 716 has been installed, but the outward end 717 has thermally expanded prior to its own installation, dry ice may be used to chill the outward end 717 in order to contract it sufficiently for installation of its receiver.

With respect to their longitudinal cross section (relative to the tube axis 790), spherical seals 718, 799 may have a round or otherwise curved longitudinal cross sectional profile. For example, as illustrated spherical seals 718 spherical seals 718 forms a crown defined by the seal radius 796 and the seal longitudinal width 798. Also as illustrated, seal radius 796 may terminate before reaching the tube OD 792 for manufacturability and to avoid undercuts.

By including at least a generally curved longitudinal cross sectional profile, and as discussed above, spherical seals 718, 799 may provide for centering and/or manual articulation during blind installation. In particular, strut bleed tubes 713 and axial bleed tubes 715 may be manually assembled into bleed elbow 714 without any visibility of the inward end 716 (e.g., inserted into bleed elbow 714 after the combustor case 310 has been installed via strut passageway 313).

According to one embodiment, the seal longitudinal width 798 may be widened to a length that is on the order of (e.g., plus or minus ten percent) half the seal radius 796 (e.g., plus or minus ten percent). In this way, a greater surface area will be in circumferential contact with its receiving bore forming the air seal. According to one embodiment, seal longitudinal width 798, may be on the order of 3/16 inch where the tube ID 791 is greater than 1 inch.

Likewise, the longitudinal cross sectional profile may vary depending on the particular requirements of tube (e.g., raised, narrowed, further widened, flattened), but should remain sufficiently curved to permit entry and to center the tube in its respective receiver, independent of its angle of entry. According to one embodiment, the seal height 797 of spherical seal 718, 799 may be on the order of at least 0.050 inch where the tube ID 791 is greater than 1 inch Where a spherical seal 718, 799 is not located substantially at a tube end, any extension of the tube beyond the spherical seal 718, 799 may be limited to a length that contemplates a desired cone of rotation for a technician to have play in the entry angle. As discussed below, the spherical seal 799 at the inward end 716 may be located near or substantially at a tube end, providing maximum entry angling. In contrast, the outward end 717 may include an outward end extension section 793 beyond its respective spherical seal 718, providing real estate for extraction features.

In addition to providing for centering and manual articulation during blind assembly, spherical seals 718, 799 may be set to take up assembly tolerances as well. For example, spherical seal 718, 799 may include a completely rounded cross sectional profile or may be have a more elongated cross sectional profile with rounded ends, wherein the elongated section provides for a greater range of tube positioning. Similarly, the seal may be positioned on the tip of the tube or at a location away from the tip. This may be done for tolerance concerns or to ensure proper assembly, as discussed further below.

According to one embodiment, the spherical seal 799 at the inward end 716 may be located substantially at the end of the tube, providing maximum entry angling. For example, where spherical seal 799 does not terminate at the inward end 716, any tube extension will be limited to that which does not interfere with the receiving bore at the maximum desired entry angle. Alternately, spherical seal 799 at the inward end 716 may be offset somewhat. This may be done where a flat (i.e., not curved), axial interface of the tube wall is desired, and/or to prevent axial contact between the spherical seal 799 and its respective receiver. According to one embodiment, the spherical seal 799 may be offset from the inward end 716 on the order of 0.10 inch where the tube ID 791 is greater than 1 inch.

In contrast, as discussed above, the outward end 717 may include an outward end extension section 793 well beyond its respective spherical seal 718, providing "real estate" for extraction features. It is understood that the self-centering entry angles of the spherical seal 718 at the outward end 717 may less of a factor than spherical seal 799 at the inward end 716, since it is limited, in addition, by the length of the cavity in which the tube is installed. Thus, the length of outward end extension section 793 may place greater consideration on the position of the extraction interface 719 and any limitation of its respective receiving member than on an entry angle.

According to one exemplary embodiment, strut bleed tubes 713 (and axial bleed tubes 715 not shown) may include a positive extraction feature at or near its outward end 717. In particular, the tubes may include an extraction interface 719 configured to attach to an extraction tool and communicate an axial force to the tube. Extraction interface 719 may reside internally, externally, or through the tube wall.

As discussed above, spherical seals 718, 799 may be located inward of the tube ends. This is particularly the case with outward end 717. In other words, strut bleed tubes 713 (and axial bleed tubes 715) may include tube sections extending beyond the spherical seal 718, such as outward end extension section 793. In this way, sufficient tube surface may be provided on the outward end 717 so that the extraction interface 719 can readily be located and accessed by an extraction tool.

For example, as illustrated, extraction interface 719 may include one or more holes drilled through the wall of either tube such that at least a portion of an extraction tool may pass through the wall and apply an axial extraction force without applying compression (i.e., radial force) to the outward end 717, which might otherwise cause wear or damage to the tube. According to one embodiment, the holes may be diametrically opposed to each other and extraction interface 719 may be engaged by passing a single pin through both holes. The holes may then be defined by an extraction hole position 794 and an extraction hole diameter 795. According to one embodiment, the extraction hole position 794 may be located between one half of extraction hole diameter 795 outward of spherical seal 718 and one full extraction hole diameter 795 inward of the outward end 717.

In this case, and in contrast to a tube substantially terminating at the spherical seal 718, strut bleed tubes 713 and axial bleed tubes 715 may extend as much as an inch beyond the spherical seal 718 to position the hole(s) on/through the tube. Moreover, the hole(s) position (i.e., outward from the spherical seal 718) may be limited to fall within a sealed cavity of a receiving member, such as within strut tube external flange assembly 710 or at the combustor/compressor secondary air interface 720, for example.

Alternately, extraction interface 719 may reside inside and/or outside of the tube. For example, extraction interface 719 may include a threaded portion inside or outside of the outward end 717. Also for example, extraction interface 719 may include a lip extending radially from the tube wall, also residing inside and/or outside of the tube. Here, also in contrast to a tube substantially terminating at the spherical seal 718, strut bleed tubes 713 and axial bleed tubes 715 may extend at the outward end 717 beyond the spherical seal 718 to locate the hole(s) and attach an extraction tool.

Returning to FIG. 3, In addition to sealing, centering, and retraction features, strut bleed tube 713 and axial bleed tube 715 may also include installation features. In particular, according to one embodiment the tubes may include features to ensure installation of each tube in its proper location by technicians. For example, despite sharing the same or similar performance requirements, strut bleed tube 713 may be of a different diameter than its corresponding axial bleed tube 715. Similarly, a forward set of tubes may differ in diameter than an aft set of tubes. In this way, one tube may be prevented from being installed in place of another tube.

Similarly, according to another embodiment, strut bleed tube 713 and axial bleed tube 715 may also include orientation features. In particular, the tubes may include features to prevent incorrect orientation during installation. For example, the outward end 717 of strut bleed tube 713 may be keyed, collared, or otherwise physically prevented from entering the receiver of its inward end 716 (i.e., installed backwards). Likewise, the outward end 717 may include a different OD than the inward end 716 to the same effect.

Also, for example, the outward end 717 of strut bleed tube 713 may be prevented from locking into place in the receiver if installed backwards. In particular, as mentioned above, spherical seals 718 may be positioned at a location away from the tip. Thus, spherical seals 718 may be at a greater distance from the tip of the outward end 717 than the depth of the inward end 716 receiving orifice (i.e., if installed backwards, the seal will not reach the receiver). Alternately, the outward end 717 of strut bleed tube 713 may have visual features indicating the direction of insertion (e.g., etched arrows, visible extraction interface 719, tube extending beyond the spherical seal 718, etc.).

Turning from the tubes to the receiving members, bleed elbow 714 may include at least two receiving orifices that are configured to interface with and pneumatically couple the inward end 716 of strut bleed tube 713 and the inward end 716 of axial bleed tube 715. While bleed elbow 714 is shown as a 90 degree elbow, it is contemplated that other angles may be used. Also, while bleed elbow 714 is illustrated as a one-to-one elbow, it is understood that a one-to-many or many-to-one connector may be used.

Bleed elbow 714 may be a dual elbow configured to pneumatically couple additional tubes and/or form part of additional flow paths. For example, as illustrated, a single bleed elbow 714 includes part of the air flow path going aft to the combustor/compressor secondary air interface 720 as well as part of the air flow path going forward to the combustor/turbine secondary air interface 740 (not shown). Alternately, bleed elbow 714 may also be divided into multiple elbows for each separate flow path.

According to one alternate embodiment, bleed elbow 714 may be fastened to a physical support structure such for added support, particularly during tube removal and installation. For example, bleed elbow 714 may include support flanges, and be bolted or otherwise fastened to bearing housing 315. In addition, bleed elbow 714 may be pinned to locate. Moreover, by fastening bleed elbow 714 to a support structure such as bearing housing 315, tube assembly may be performed at a top assembly level.

Bleed elbow 714 may be made of a similar material as its respective tubes (e.g., 300 CRES). However, given the interference seal to be formed, bleed elbow 714 may be made of a gall resistant material, such as NITRONIC 60. With regard to galvanic action, while these two alloys (300 CRES for the tubes and NITRONIC 60 for the elbow) would be considered dissimilar materials under normal passivating conditions, the anode/cathode (Iron/NITRONIC 60) ratio is quite large, so the risk of significant galvanic corrosion of the iron (the anode) may be limited.

Figure 5:
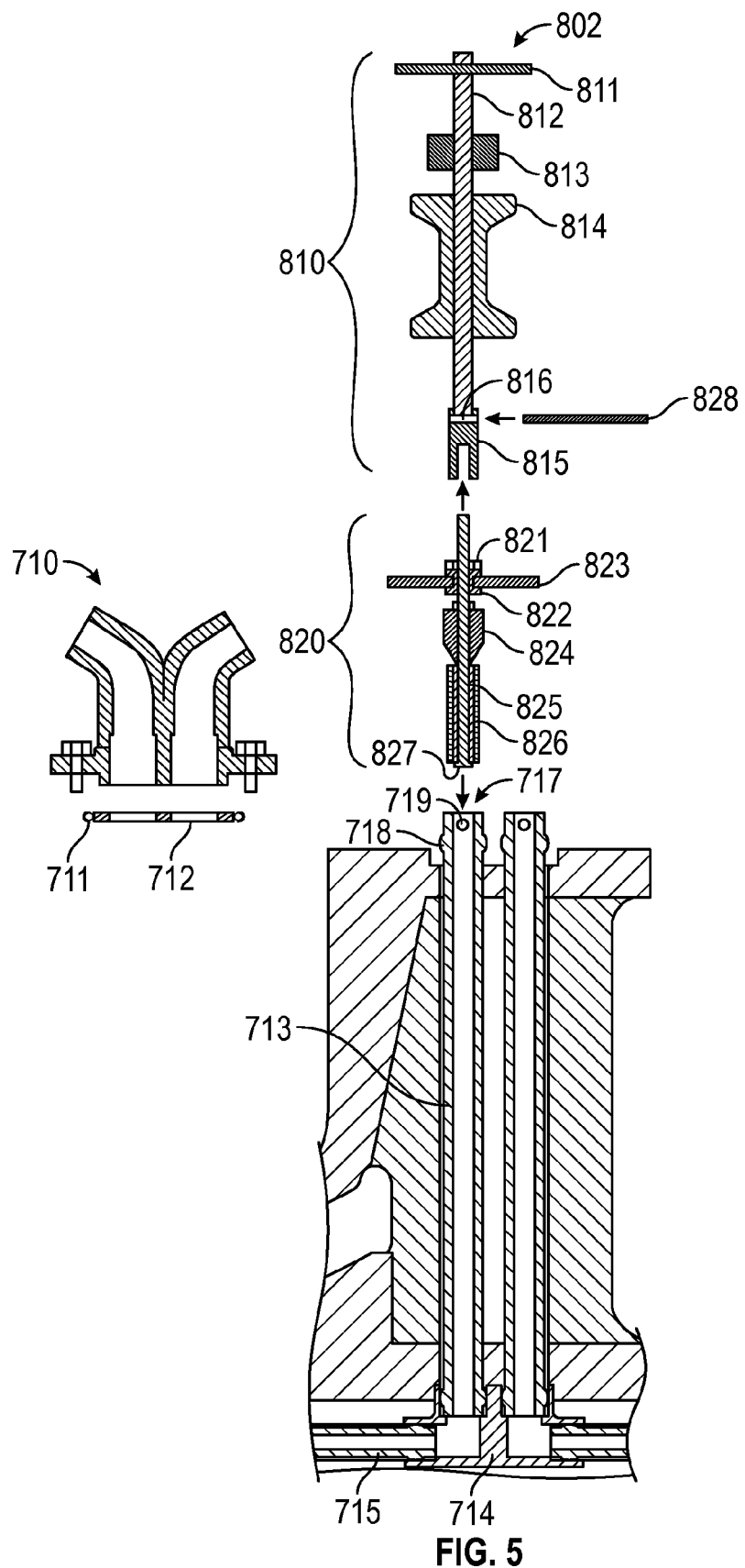
FIG. 5 is a cross sectional view of portions of a secondary air system tubing assembly and a system for its modification.

FIG. 5 is a cross sectional view of portions of a secondary air system tubing assembly and a system for its modification. As illustrated, an extraction tool 802 may access, and then mechanically couple with an outward end 717 of strut bleed tube 713 (or axial bleed tube 715) for forcible removal. The extraction tool 802 may include a handle assembly 810 and a tube removal assembly 820, wherein the tube removal assembly 820 mechanically couples to the handle assembly 810. Accordingly, a field technician may attach the tube removal assembly 820 to the handle assembly 810, access the outward end 717 of the tube to be pulled, attach the tube removal assembly 820 to the tube, and apply an axial force to the tube to be removed In the case of the strut bleed tube 713, the outward end 717 may be readily accessed by removing strut tube external flange assembly 710 and any associated hardware (such as c-seal 711 and faceplate 712). Alternately (and with reference to FIG. 2), in the case of the axial bleed tube 715, the outward end 717 may be accessed by exposing one or both of the combustor/compressor secondary air interface 720 and the combustor/turbine secondary air interface 740. In particular, one or both end cap assemblies 317 (compressor side and turbine side) may be removed from bearing housing 315 (along with any associated hardware, such as seals, intermediate tubes, orifices, etc.). Accordingly, modifications to the secondary air system 700, and thus gas turbine engine 100, may be performed without a full disassembly of the combustor 300.

Returning to FIG. 4, as discussed above, extraction tool 802 communicates an axial force to the tubes. Thus, once coupled to the strut bleed tube 713, handle assembly 810 may be used to apply the axial force, breaking the interference fit between spherical seal 718 and strut bleed tube's 713 receiver (i.e., bleed elbow 714).

Regarding the tube removal assembly 820, tube removal assembly 820 may generally use any mechanism to mechanically couple with the tube to be removed. As discussed above, strut bleed tubes 713 and axial bleed tubes 715 may include an extraction interface 719 that resides internally, externally, or through the tube. Accordingly, tube removal assembly 820 may include a reciprocal interface to mechanically couple with extraction interface 719. For example, where strut bleed tubes 713 are threaded, tube removal assembly 820 may include mating threads (not shown).

Also for example, where extraction interface 719 include one or more holes made into strut bleed tubes 713 (as shown), tube removal assembly 820 may include an extraction pin 828 that slides through the extraction interface 719 (e.g., through the holes on opposing sides of the tube wall). In this example, extraction pin 828 may mechanically couple to the handle assembly 810 by simultaneously sliding through a reciprocal slot 816 in the handle assembly 810.

In addition, tube removal assembly 820 may include multiple attachment mechanisms. For example a single tube removal assembly 820 may be configured to mechanically couple with both a hole-type extraction interface 719 and a threaded-type extraction interface (not shown). Alternately, extraction tool 802 may include a single handle assembly 810, but multiple tube removal assemblies 820 (adapted to different diameter tubes, for example). Furthermore, tube removal assembly 820 may include attachment mechanisms that do not correspond to any extraction interface 719, i.e., interfacing with a plain/smooth tube.

According to an exemplary embodiment, tube removal assembly 820 may be configured to mechanically couple with strut bleed tube 713 (or axial bleed tube 715) without relying on positive extraction interface 719. In particular, tube removal assembly 820 may create a friction interface with an otherwise plain/smooth tube to form its mechanical couple. For example, tube removal assembly 820 may include a jam nut 821, a rotation nut 822, a rotation handle 823, an expander 824, an expanding collet 825, a friction interface material 826 (e.g., synthetic polymer such as neoprene or spring rubber tube, or similar material), and a keeper rod 827.

Together, rotation nut 822 may be twisted through its thread path so as to press expander 824 into expanding collet 825. Constrained against keeper rod 827 expanding collet 825 is thus forced to expand, exerting radial pressure against friction interface material 826. When positioned inside a plain/smooth tube such as strut bleed tube 713, a substantial friction interface may be created. Once an adequate mechanical coupling is created (i.e., sufficient static friction based on the compressed friction interface material 826), jam nut 821 may be tightened against rotation handle 823 in order to prevent inadvertent release.

Regarding the handle assembly 810, handle assembly 810 may generally use any mechanism to impart an axial force to the tube to be removed. Handle assembly 810 may use impact force or static pressure to apply the axial force to the tube(s) to be removed. Furthermore, handle assembly 810 may include a mechanical, hydraulic, electrical, and/or pneumatic force generator to generate the axial removal force.

According to an exemplary embodiment, handle assembly 810 may include a sliding hammer mechanism to generate the axial removal force. In particular, handle assembly 810 may include a rotation handle 811, a rod 812, a slide hammer stop 813, a slide hammer 814, and an attachment port 815. The rotation handle 811, the slide hammer stop 813, and the attachment port 815 may be fixed to the rod 812. The slide hammer 814 may also be fixed to the rod 812, but is free to slide back and forth in the axial direction (as defined by the rod 812) and between the slide hammer stop 813 and the attachment port 815. The attachment port 815 is configured to mechanically couple the handle assembly 810 and tube removal assembly 820.

Once the tube removal assembly 820 is also mechanically coupled to the tube to be pulled, handle assembly 810 may impart an impact force in the axial direction by sliding the slide hammer 814 into the slide hammer stop 813, thus transferring its momentum to the tube to be pulled, via the tube removal assembly 820. In this embodiment, a field technician may access the tube to be pulled attach the tube removal assembly 820 to the handle assembly 810, access the outward end 717 of the tube to be pulled, attach the tube removal assembly 820 to the tube, and operate the slide hammer mechanism without any external power source.

INDUSTRIAL APPLICABILITY

Figure 6:
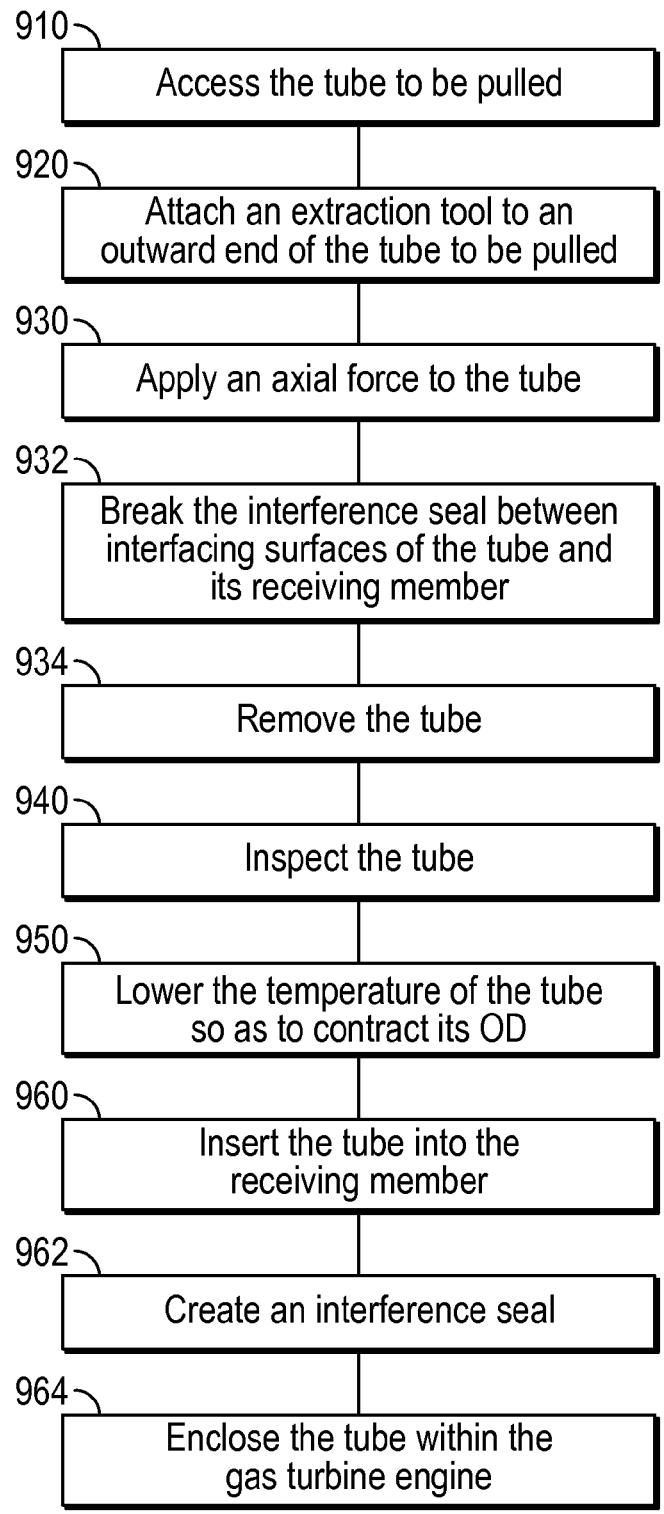
FIG. 6 is a flow chart of an exemplary method for modifying a gas turbine engine.

FIG. 6 is a flow chart of an exemplary method for modifying a gas turbine engine. In particular, a gas turbine engine 100 may be modified, retrofitted, or manufactured as described above using the following steps, the above description, or a combination thereof. As illustrated (and with reference to FIGS. 1-4), gas turbine injector may be modified by first accessing the tube to be pulled 910. For example, in the case of strut bleed tube 713, this may include removing the strut tube external flange assembly 710. Also for example, in the case of axial bleed tube 715, this may include removing the end cap assembly 710.

Next, the method may include attaching an extraction tool to an outward end of the tube to be pulled 920. For example, the tube to be removed may include a positive extraction interface 719 wherein an extraction pin 828 may be passed through both the outward end 717 of the tube and the extraction tool 802, thus creating a positive mechanical couple. Also for example, where an extraction interface 719 is not used, extraction tool 802 may form a friction mechanical couple (i.e., where the tube and the tool removal assembly 820 are prevented from separating due to radial forces exerted on the friction interface material 826 within the tube, as described above).

Once the extraction tool has been attached, the method continues with applying an axial force to the tube 930. The axial force may be supplied using the extraction tool 802, the axial force being relative to the tube axis and outward in direction. For example, where the handle assembly 810 of extraction tool 802 includes a slide hammer 814 and a slide hammer stop 813 as discussed above, the axial force may be an impact force supplied from sliding the slide hammer 814 into the slide hammer stop 813.

The method continues with breaking the interference seal between interfacing surfaces of the tube and its receiving member 932, and removing the tube 934. For example, in the case of strut bleed tube 713, this may include breaking the interference seal with the spherical seal 718 and the strut tube external flange assembly 710, and removing the strut bleed tube 713 from the strut 312. Also for example, in the case of axial bleed tube 715, this may include breaking the interference seal with the spherical seal 718 and either the end cap assembly 710 or the bearing housing 315, and removing the axial bleed tube 713 from the bearing housing 315.

According to one embodiment, either of the strut bleed tube 713 and axial bleed tube 715 may be reinstalled. In which case, the method may include inspecting the tube 940. For example, the tube(s) may be cleaned, inspected through noninvasive techniques and/or refurbished.

In anticipation of reassembly, the tube may be pre-cooled. In particular, the method may include lowering the temperature of the tube so as to contract its OD 950. As described above, the tube may be chilled such that cross sectional outer profile of spherical seal 718 may be freely inserted into the receiving member.

The method continues with inserting the tube into the receiving member 960, and creating an interference seal 962. As discussed above, the interference seal is formed by the tube/spherical seal 718 thermally expanding such that its OD exerts an outward force against the ID of the receiving member. The method may also include enclosing the tube within the gas turbine engine 964. In particular, in the case of strut bleed tube 713, the outward end 717 may be enclosed by reassembling the strut tube external flange assembly 710 and any associated hardware. Also for example, in the case of axial bleed tube 715, the outward end 717 may be enclosed by reassembling the end cap assembly 710 and any associated hardware. In either case, the step of enclosing the tube within the gas turbine engine 964 may be done before creating an interference seal 962 as the receiving member of the outward end 717 may also form an interference seal and require the tube to be in its contracted state to do so, as well as to be reassembled.

Although this invention has been shown and described with respect to a detailed embodiment thereof, it will be understood by those skilled in the art that various changes in form and detail thereof may be made without departing from the spirit and scope of the claimed invention. Accordingly, the preceding detailed description is merely exemplary in nature and is not intended to limit the invention or the application and uses of the invention. In particular, the described embodiments are not limited to use in conjunction with a particular type of gas turbine engine. For example, the described embodiments may be applied to stationary or motive gas turbine engines, or any variant thereof. It will be recognized that in some instances the described embodiments may also be used in machines that also use ducted secondary air. Furthermore, there is no intention to be bound by any theory presented in any preceding section. It is also understood that the illustrations may include exaggerated dimensions and graphical representation to better illustrate the referenced items shown, and are not consider limiting unless expressly stated as such.

What is claimed is:

1. A method for modifying a gas turbine engine, the method comprising:
   accessing a first outward end of a first tube installed in the gas turbine engine, the first tube having a tube axis;
   attaching an extraction tool including a tube removal assembly and a handle assembly coupled to the tube removal assembly to the first outward end of the first tube by twisting a rotation nut with a rotation handle to press an expander into an expanding collet to create a friction interface with the first tube, the tube removal assembly including the rotation nut, the rotation handle, the expander, and the expanding collet;
   applying an axial force to the first tube using the extraction tool, the axial force relative to the tube axis;
   breaking a first interference seal between a first interface surface on a first inward end of the first tube and a receiving member of the gas turbine engine; and
   removing the first tube from the gas turbine engine,
   wherein the attaching the extraction tool to the first outward end of the first tube comprises passing an extraction pin through both the first outward end of the first tube and the extraction tool.

2. The method of claim 1, further comprising:
   creating a second interference seal between a second interface surface on a second inward end of a second tube and the receiving member of the gas turbine engine.

3. The method of claim 2, wherein the second interface surface has a cross sectional outer profile, relative to the tube axis, and wherein the receiving member of the gas turbine engine has an associated cross sectional inner profile, the method further comprising:
   lowering the temperature of the second interface surface sufficiently below that of the receiving member so as to contract the cross sectional outer profile such that the cross sectional outer profile may be inserted into the cross sectional inner profile of the receiving member without creating the second interference seal between the second interface surface and the receiving member; and inserting the second inward end of the second tube into the receiving member;

wherein the creating the second interference seal between the second interface surface and the receiving member comprises the second interference seal thermally expanding such that the cross sectional outer profile exerts an outward force against the cross sectional inner profile of the receiving member.

4. The method of claim 1, further comprising:

inspecting the first tube after the removing the first tube from the gas turbine engine;

inserting the first inward end of the first tube back into the receiving member; and creating a second interference seal between the first interface surface on the first inward end of the first tube and the receiving member of the gas turbine engine.

5. The method of claim 1, wherein the accessing the first outward end of the first tube comprises decoupling an external flange assembly that is pneumatically coupled to the first outward end of the first tube and mechanically coupled to the gas turbine engine.

6. The method of claim 1, wherein the handle assembly comprises a slide hammer and a slide hammer stop that are configured to supply an axial impact force; and wherein the applying the axial force to the first tube comprises sliding the slide hammer into the slide hammer stop so as to supply the axial impact force.

7. A method for modifying a secondary air system in gas turbine engine, the gas turbine engine having an axis of rotation, a combustor section, and a strut, the strut extending radially from the axis of rotation in the combustor section and including a strut passageway, the method comprising:

accessing a first outward end of a first strut tube installed in the strut, the first strut tube having a first strut tube axis;

attaching an extraction tool to the first outward end of the first strut tube including passing an extraction pin through both the first outward end of the first strut tube and the extraction tool;

applying an axial force to the first strut tube using the extraction tool, the axial force relative to the first strut tube axis;

breaking a first interference seal between a first interface surface on a first inward end of the first strut tube and a receiving member of the gas turbine engine;

removing the first strut tube from the strut;

accessing a second outward end of a first axial tube installed in the gas turbine engine, first axial tube having a first axial tube axis substantially running parallel to the axis of rotation;

attaching the extraction tool to the second outward end of the first axial tube;

applying a second axial force to the first axial tube using the extraction tool, the second axial force relative to the first axial tube axis;

breaking a second interference seal between a second interface surface on a second inward end of the first axial tube and the receiving member of the gas turbine engine; and removing the first axial tube from the gas turbine engine.

8. The method of claim 7, wherein the accessing the first outward end of the first strut tube comprises decoupling an external flange assembly that is pneumatically coupled to the first outward end of the first strut tube and mechanically coupled to the gas turbine engine; and wherein the accessing the second outward end of first axial tube comprises removing an end cap assembly from a bearing housing of the gas turbine engine.

9. The method of claim 7, wherein the extraction tool includes a tube removal assembly configured to apply a radial force against an internal portion of a tube; and wherein the attaching the extraction tool to the second outward end of the second strut tube comprises radially expanding the tube removal assembly within the second strut tube, relative to the second strut tube axis, and creating a friction mechanical couple.

10. The method of claim 7, wherein the extraction tool includes a handle assembly comprising a slide hammer and a slide hammer stop that are configured to supply an axial impact force; and wherein the applying the axial force to the first strut tube comprises sliding the slide hammer into the slide hammer stop so as to supply the axial impact force.

11. The method of claim 7, further comprising:

lowering the temperature of a second strut tube below that of the receiving member, the second strut tube having a second strut tube axis and a third interface surface, the third interface surface having a cross sectional outer profile relative to the second strut tube axis, the receiving member having an associated cross sectional inner profile, wherein the temperature of the second strut tube is lowered sufficiently to thermally contract the cross sectional outer profile of the third interface surface such that the cross sectional outer profile of the may be inserted into the cross sectional inner profile of the receiving member without creating a third interference seal between the third interface surface and the receiving member;

inserting the third interface surface into the receiving member; and creating a third interference seal between the third interface surface and the receiving member, wherein the creating the third interference seal between the third interface surface and the receiving member includes the third interference seal thermally expanding such that the cross sectional outer profile exerts a radial force, relative to the second strut tube axis, against the cross sectional inner profile of the receiving member.

12. A method for modifying a gas turbine engine, the method comprising:

accessing a first outward end of a first tube installed in the gas turbine engine, the first tube having a tube axis;

attaching an extraction tool to the first outward end of the first tube including passing an extraction pin through both the first outward end of the first tube and the extraction tool;

applying an axial force to the first tube using the extraction tool, the axial force relative to the tube axis;

breaking a first interference seal between a first interface surface on a first inward end of the first tube and a receiving member of the gas turbine engine; and removing the first tube from the gas turbine engine.

13. The method of claim 12, further comprising:

creating a second interference seal between a second interface surface on a second inward end of a second tube and the receiving member of the gas turbine engine.

14. The method of claim 13, wherein the second interface surface has a cross sectional outer profile, relative to the tube axis, and wherein the receiving member of the gas turbine engine has an associated cross sectional inner profile, the method further comprising:

lowering the temperature of the second interface surface sufficiently below that of the receiving member so as to contract the cross sectional outer profile such that the cross sectional outer profile may be inserted into the cross sectional inner profile of the receiving member without creating the second interference seal between the second interface surface and the receiving member; and inserting the second inward end of the second tube into the receiving member, wherein the creating the second interference seal between the second interface surface and the receiving member comprises the second interference seal thermally expanding such that the cross sectional outer profile exerts an outward force against the cross sectional inner profile of the receiving member.

15. The method of claim 12, further comprising:

inspecting the first tube after the removing the first tube from the gas turbine engine;

inserting the first inward end of the first tube back into the receiving member; and creating a second interference seal between the first interface surface on the first inward end of the first tube and the receiving member of the gas turbine engine.

16. The method of claim 12, wherein the extraction tool includes a handle assembly including a slide hammer and a slide hammer stop that are configured to supply an axial impact force; and wherein the applying an axial force to the first tube comprises sliding the slide hammer into the slide hammer stop so as to supply the axial impact force.

\* \* \* \* \*